United States Patent [19]

Anderson, Jr.

[11] Patent Number: 4,544,675
[45] Date of Patent: Oct. 1, 1985

[54] RECLAIMING OF VULCANIZED RUBBER

[75] Inventor: Edward Anderson, Jr., North Canton, Ohio

[73] Assignee: The Goodyear Tire & Rubber Company, Akron, Ohio

[21] Appl. No.: 616,744

[22] Filed: Jun. 4, 1984

[51] Int. Cl.$^4$ ............................................. C08J 11/04
[52] U.S. Cl. ................................. 521/43; 521/44.5; 521/45
[58] Field of Search ................... 521/43, 44.5, 45

[56] References Cited

U.S. PATENT DOCUMENTS

| | | | |
|---|---|---|---|
| 2,581,919 | 1/1952 | Albert | 260/609 |
| 2,593,279 | 4/1952 | Elgin | 521/43 |
| 2,605,241 | 7/1952 | Albert | 521/43 |
| 2,610,925 | 9/1952 | Staten | 521/43 |
| 2,612,479 | 9/1952 | Kirby et al. | 521/43 |
| 2,713,561 | 7/1955 | Cook et al. | 521/43 |
| 3,267,067 | 8/1966 | Mersereau et al. | 521/43 |
| 4,211,676 | 7/1980 | Watabe et al. | 521/43 |

FOREIGN PATENT DOCUMENTS

| | | | |
|---|---|---|---|
| 1032011 | 6/1966 | United Kingdom . | |
| 118172 | 1/1958 | U.S.S.R. | 521/43 |

*Primary Examiner*—Allan M. Lieberman
*Attorney, Agent, or Firm*—H. C. Young, Jr.

[57] ABSTRACT

In a process for reclaiming sulfur-vulcanized rubber in the presence of oil, water vapor and aryl disulfide peptizer at elevated pressure and temperature, an improvement where said disulfide is obtained as a mixture also containing dissolved volatile mercaptan which comprises treating said disulfide mixture by distillation prior to its use in said reclaim process to remove said volatile mercaptan.

2 Claims, No Drawings

RECLAIMING OF VULCANIZED RUBBER

FIELD

This invention relates to reclaiming sulfur-vulcanized rubber.

BACKGROUND

The reclaiming of scrap vulcanized rubber relates to the treating and processing of the vulcanized material to obtain products which are generally plastic and processible in nature and thus suitable for utilization to prepare or produce various articles of manufacture.

Generally, a vulcanized rubber reclaiming process involves the steps of preparation, breakdown and refining.

In the preparation step, scrap vulcanized rubber is divided into small particles, such as by cracking or grinding and most foreign materials such as metal and fiber are removed.

In the breakdown step, the rubber is partially depolymerized and possibly partially devulcanized.

In the refining or finishing process, the reclaimed rubber is recovered from the breakdown station from which it can then be mixed with other reinforcing and processing agents for future use.

In the breakdown step, the vulcanized rubber is typically broken down in the presence of a reclaim oil and peptizer, or catalyst, under conditions of elevated temperature and pressure for a period of time, often also in the presence of water vapor, or steam. Such processes are sometimes called the heater process, the digester process, the Reclaimator process or the high-pressure steam process. Although some vulcanized rubbers can be broken down under a condition of heating alone, peptizers are typically added to speed the degradation process.

Reclaiming peptizers or catalysts may be, for example, aryl sulfides and disulfides.

Reclaiming oils generally function to swell and plasticize the scrap vulcanized rubber in order to make it more receptive to the action of the peptizer.

In the practice of such reclaiming process, a relatively pungent odor of the finished reclaimed rubber has been observed. While not effecting its various physical properties, it has tended to render the finished reclaim rubber objectionable for use in relatively confined areas, particularly where it is used for mixing with other materials, such as other rubbers, the the preparation of other products. It was speculated and considered that some reaction of the disulfide peptizer was with other components in the mixture was occurring to form by-products which created the odorous effect.

However, the inventor discovered, upon fractionating the liquid aryl disulfide, that the mixture in fact contained a dissolved volatile component having a boiling point, at atmospheric pressure, below about 95° C. which was composed primarily of odorous organic mercaptans. The presence of the volatile organic component in the mixture was not earlier observed because, at atmospheric conditions, it remained substantially dissolved in the disulfide and presented little or no obvious odorous effect and thus was not noticeably detected.

DISCLOSURE AND PRACTICE OF THE INVENTION

In accordance with this invention, in a process for reclaiming rubber in which a sulfur-vulcanized rubber is broken down in the presence of reclaiming oil, water vapor and aryl disulfide peptizer under a condition of elevated temperature and pressure, an improvement in where said aryl disulfide is obtained as a mixture of aryl disulfide containing volatile mercaptan dissolved therein, which comprises treating said mixture by distillation prior to its use in said reclaiming process to remove said volatile mercaptan.

In the practice of this invention the aryl disulfide mixture originally may contain in the range of about 2 to about 8, and more typically about 3 to about 7, weight percent, based on said mixture, of volatile mercaptan dissolved therein. The said mercaptan component has been observed to have a boiling point (atmospheric pressure) typically in the range of about 65° C. to about 95° C. and usually less than about 80° C.

The reclaiming process is typically carried out at a temperature in the range of about 175 to about 195° C. at a pressure in the range of about 230 to about 260 psi over a period of time ranging from about 1 to about 4 hours.

It was readily observed by the inventor, after making the discovery of the effect of the volatile mercaptan component in the aryl disulfide peptizer, rather than the previously considered by-product reaction taking place, and after treating the mixture to remove the volatile mercaptan component, that the odor in the resulting reclaimed rubber was substantially reduced and was made acceptable in relatively confined areas for production of products containing such reclaimed rubber. It was also observed that the quality (physical properties) was not significantly altered by the peptizer pretreatment process.

The practice of this invention is further illustrated by reference to the following example which is intended to be representative rather than restrictive of the scope of the invention. Unless otherwise indicated, all parts and percentages are by weight.

EXAMPLE I

A sulfur-vulcanized rubber was obtained by destroying whole rubber pneumatic tires in which parts or wire and fiber were essentially removed to yield particles of the vulcanized rubber having an average particle size in the range of about 6 to about 30 U.S. standard mesh size.

The vulcanized rubber particles were charged to a tank having a volume of about 10,000 gallons (2,640 liters) to which was also charged reclaim oil, water and an aryl disulfide peptizer. The container was closed and the mixture heated to a temperature of about 180° C. where the pressure was allowed to assume about 250 psi. After about 3 hours the resulting reclaimed rubber product was recovered.

Two of such reclaim runs (or treatments) were made. In the first treatment (A) a disulfide peptizer was used which had not been pretreated. In the second reclaim treatment (B), the disulfide peptizer was pretreated by distillation to remove its volatile component. The volatile component was analyzed and determined to be composed primarily of mercaptan(s). In previous times the odorous mercaptan(s) was(were) not readily observed, apparently because, in the dissolved form in the disulfide mixture, the characteristic order was not readily noticed by the inventor.

The aryl disulfide utilized was determined to have the following composition shown in Table 1 which depicts the composition as materials for the disulfide mixture for the first treatment (A) and for the treated disulfide mixture used in the second reclaim treatment (B).

TABLE 1

| Material | Disulfide A | Disulfide B |
| --- | --- | --- |
| Volatile Mercaptan Fraction (65° to 95° C. boiling point) | 5% | 0% |
| Diphenyl Disulfide | 14% | 15% |
| Dicresyl Disulfide | 47% | 50% |
| Dixylyl Disulfide | 34% | 35% |
| Total | 100% | 100% |

The vulcanized rubber particles, reclaim oil, water and amount of aryl disulfide used in the reclaim treatments (A and B) are shown in the following Table 2, which is based on 100 parts by weight vulcanized rubber particles.

TABLE 2

| Materials[1] | Composition A | Composition B |
| --- | --- | --- |
| cured tire vulcanized rubber | 100 | 100 |
| Reclaim Oil[2] | 15 | 15 |
| Aryl Disulfide (According to Example 1) | 1.5 | 1.5 |

[1]The materials include water which is introduced in the form of superheated steam under the treatment conditions.
[2]The reclaim oil can be described as naphthenic rubber reclaim oil obtained as MPO-60 reclaim oil from the Crowley Tar Product company.

The reclaim compositions A and B were formulated with compounding ingredients and cured to form rubber compositions which were evaluated and found to have essentially or practically identical physcial properties such as tension (modulus) and elongation.

Reclaim rubber (A) was noticeably odorous and the water condensate mixture vented at the end of the reclaim process was also very noticeably odorous with an obnoxious odor.

In direct contrast, reclaim rubber (B), using the treated aryl disulfide peptizer mixture was substantially odor-free (at least of the obnoxious mercaptan-type odor) as was the condensate.

While certain representative embodiments and details have been shown for the purpose of illustrating the invention, it will be apparent to those skilled in this art that various changes and modifications may be made therein without departing from the spirit or scope of the invention.

I claim:

1. In a process for reclaiming rubber in which a sulfur-vulcanized rubber is broken down in the presence of reclaiming oil, water vapor and aryl disulfide peptizer under a condition of elevated temperature in the range of about 175° C. to about 195° C. and at a pressure in the range of about 230 to about 260 psi over a period of about 1 to about 4 hours, wherein said aryl disulfide is obtained as a mixture of aryl disulfide containing volatile mercaptan dissolved therein, the improvement which comprises treating said mixture by distillation prior to its use in said reclaiming process to remove said volatile mercaptan; wherein said aryl disulfide mixture, prior to treatment by distillation, contains about 2 to about 8 weight percent volatile mercaptan dissolved therein having a boiling point at atmospheric pressure in the range of about 65° C. to about 95° C.

2. The process of claim 1 where the aryl disulfide component of said disulfide mixture is composed primarily of diphenyl disulfide, dicresyl disulfide and dixylyl disulfide.

* * * * *